United States Patent
Okawa et al.

[19]

[11] Patent Number: 6,157,160
[45] Date of Patent: Dec. 5, 2000

[54] ENERGIZATION CONTROL OF A SWITCHED RELUCTANCE MOTOR

[75] Inventors: Akemi Okawa; Tomohiro Fukushima; Yuichiro Kitamura; Xiaoou Ma, all of Aichi-ken, Japan

[73] Assignee: Aisin Seiki Kabushiki Kaisha, Kariya, Japan

[21] Appl. No.: 09/280,701

[22] Filed: Mar. 30, 1999

[30] Foreign Application Priority Data

Mar. 30, 1998 [JP] Japan .................................. 10-083438

[51] Int. Cl.[7] ...................................................... H02P 1/46
[52] U.S. Cl. ............................................ 318/701; 318/254
[58] Field of Search .................................. 318/254, 701, 318/432, 700

[56] References Cited

U.S. PATENT DOCUMENTS

| | | | |
|---|---|---|---|
| 4,710,686 | 12/1987 | Guzik ........................................ | 318/293 |
| 4,879,641 | 11/1989 | Rossi et al. ................................ | 363/98 |
| 5,552,683 | 9/1996 | Dargent ..................................... | 318/287 |
| 5,744,922 | 4/1998 | Neary et al. ............................... | 318/293 |
| 5,801,504 | 9/1998 | Endo et al. ................................ | 318/434 |
| 5,959,419 | 9/1999 | Sugiyama ................................. | 318/293 |

*Primary Examiner*—Bentsu Ro
*Assistant Examiner*—Rina Duda
*Attorney, Agent, or Firm*—Sughrue, Mion, Zinn, Macpeak & Seas, PLLC

[57] ABSTRACT

A switched reluctance motor is provided with multi-phase coils on the stator poles. An energization on angle, a first energization off angle, a second energization off angle and a target value corresponding to an angle of rotation are determined with respect to each coil on the basis of a target torque and a rotation speed. A pair of transistors which act as switching elements are both turned on when the angle of rotation is reached at the energization on angle. One transistor is turned off if a value of an actual current is target value of the current while the angle of rotation is not reached at the first energization off angle. The same transistor is turned off irrespective of the magnitude of the value of the actual current and the target value of the current when the angle of rotation is reached at the first energization off angle. The transistors are both turned off when the angle of rotation is reached at the second energization off angle.

3 Claims, 8 Drawing Sheets

Fig. 7 current map memory :

energisation on angle, energisation off angle and target value of current corresponding to torque and rotation revolution

|  |  | torque N·m | | | | | | |
|---|---|---|---|---|---|---|---|---|
|  |  | ··· 10 | 15 | 20 | 25 | 30 | 35 | ··· |
| number of revolutions rpm | 3000 | ··· C11 | C21 | C31 | C31 | C41 | C51 | ··· |
|  | 4000 | ··· C12 | C22 | C32 | C42 | C52 | C62 | ··· |
|  | 5000 | ··· C13 | C23 | C33 | C43 | C53 | C63 | ··· |
|  | 6000 | ··· C14 | C24 | C34 | C44 | C54 | C64 | ··· |
|  | 7000 | ··· C15 | C25 | C35 | C45 | C55 | C65 | ··· |
|  | 8000 | ··· C16 | C26 | C36 | C46 | C56 | C66 | ··· | e.g. contents of C34 :
44.0 [deg] (ON angle)
58.0 [deg] (OFF angle 1)
66.0 [deg] (OFF angle 2)
300 [A] (target current value)

Fig. 8 energisation map :

target value of current corresponding to angle of rotation of rotor within angle section 0 to 90 degrees

| angle of rotation of rotor | Phase 1 | Phase 2 | Phase 3 |
|---|---|---|---|
| 0.0° | 0 A | 0 A | 300A |
| 0.5° | 0 A | 0 A | 300A |
| 1.0° | 0 A | 0 A | 300A |
| 1.5° | 0 A | 0 A | 300A |
|  |  |  |  |

ENERGIZATION CONTROL OF A SWITCHED RELUCTANCE MOTOR

FIELD OF THE INVENTION

The invention relates to an energisation control of a switched reluctance motor.

BACKGROUND OF THE INVENTION

An R motor generally comprises a rotor with poles which project outwardly and a stator with poles which project inwardly. The rotor is an iron core and comprises a lamination of a number of thin iron sheets. The stator is a ring-shaped iron core and comprises a lamination of a number of ring-formed thin iron sheets and each of the poles carries an electrical coil made of copper. Each pole of the stator acts as an electromagnet and the rotor rotates when the poles of the rotor are drawn by the magnetic fore of the poles of the stator. By monitoring an angle of rotation of the rotor and switching the energisation of the coils C in synchronism with the rotation of the rotor, the rotor is controlled to rotate in the desired direction. An example of an SR motor is disclosed in JP 07 (1995)-274570 A.

The SR motor shown in the publication comprises three phase coils. Each coil has one end connected through a first switching element to a high potential line of a power supply while the other end of the coil is connected through a second switching element to a low potential line of the power supply. The one end of the coil is connected to the low potential line through a first diode which allow a current flow from the latter to the former while the other end of the coil is connected to the high potential line through a second diode which allows a current flow from the former to the latter.

On the basis of information fed from means for detecting an angle of rotation of the rotor, means for detecting a rotation speed of the rotor, means for detecting an actual current passing through each coil and the outside, the target torque is determined for the SR motor and the energisation of the current is controlled as follows: an energisation ON angle, an energisation OFF angle and a target value corresponding to an angle of rotation are determined with respect to each coil on the basis of a target torque and a rotation speed. The first and second switching elements are both turned on when the angle of rotation is reached at the energisation on angle. The first switching element is turned off if a value of an actual current is over the target value of the current while the angle off rotation is not reached at the energisation OFF angle. The first and second switching elements are both turned off when the angle of rotation is reached at the energisation OFF angle.

Any loss should be reduced to improve the efficiency of the SR motor. Loss of the SR motor is in general caused by the following three elements. The first one is a copper loss that is a joule heat dependent on values of electric resistance and energising current. The second one is a mechanical lows that is windage dependent on rotor rotation and friction loss caused at a bearing of the driving shaft connected to the rotor. The third one is an iron loss that is generated since an alternating magnetic field is generated in the iron cores of the rotor and the stator. The iron loss increases in proportion to the rotation speed of the motor and the maximum magnetic density or the square thereof.

SUMMARY OF THE INVENTION

Accordingly, an object of the invention is to reduce the iron loss of the SR motor so as to improve the efficiency thereof. In accordance with the invention, means for controlling the energisation controls as follows: a target torque is determined for the SR motor on the basis of information fed from means for detecting an angle of rotation of a rotor, means for detecting a rotation speed of the rotor, means for detecting an actual current passing through each phase coil and the outside, an energisation ON angle, a first and a second energisation OFF angle and a target value of a current are determined with respect to each coil on the basis of a target torque and a rotation speed, the first and second switching elements are both turned off when the angle or rotation is within a section from the second energisation OFF angle to the energisation ON angle, the actual value of the current is approximated to the target value by means of alternate repeat that when either the first and second switching element is turned on the other is turned off and the first and second switching element are both turned on when the angle of rotation is within a section from the energisation ON angle to the first energisation OFF angle, and either the first and second switching element is turned on the other is turned off when the angle of rotation is within a section from the first to second energisation OFF angles. Therefore, iron loss is reduced and efficiency of the SR motor is improved, especially when the SR motor is driven in middle and high speed and when the target torque is low.

DESCRIPTION OF THE PREFERRED EMBODIMENT

Figure 1:
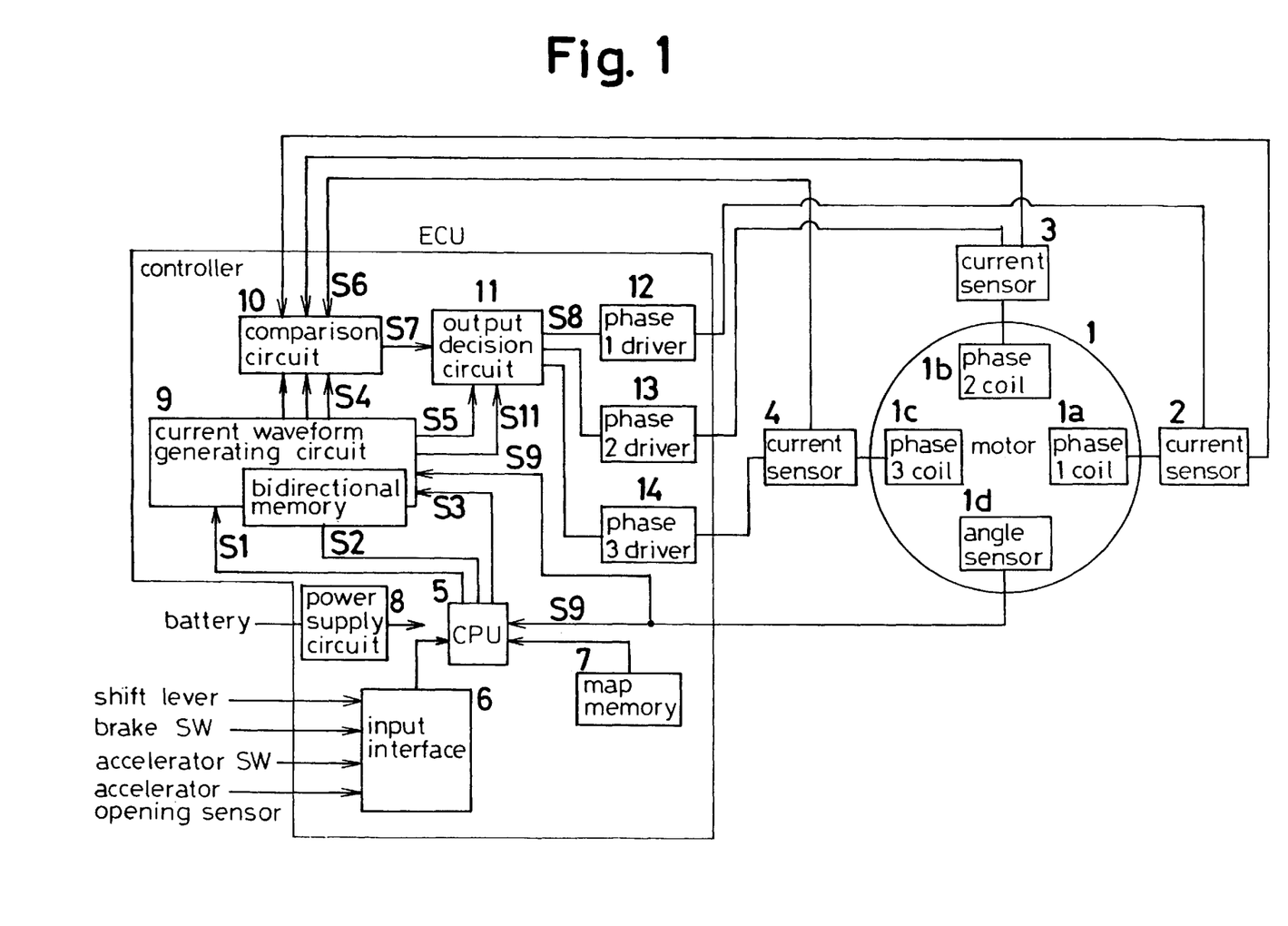
FIG. 1. is a block diagram of an embodiment of the invention.

FIG. 1 is a block diagram showing essential portions of a driving unit for an electric vehicle. The device shown in FIG. 1 comprises a SR motor provided as a drive source which is controlled by the controller ECU. The controller ECU controls the driving of the SR motor 1 on the basis of information which is fed from a shift lever, a brake switch, an accelerator switch and an accelerator opening sensor. It will be seen that a storage battery is utilized as a power supply to control the above.

Figure 3:
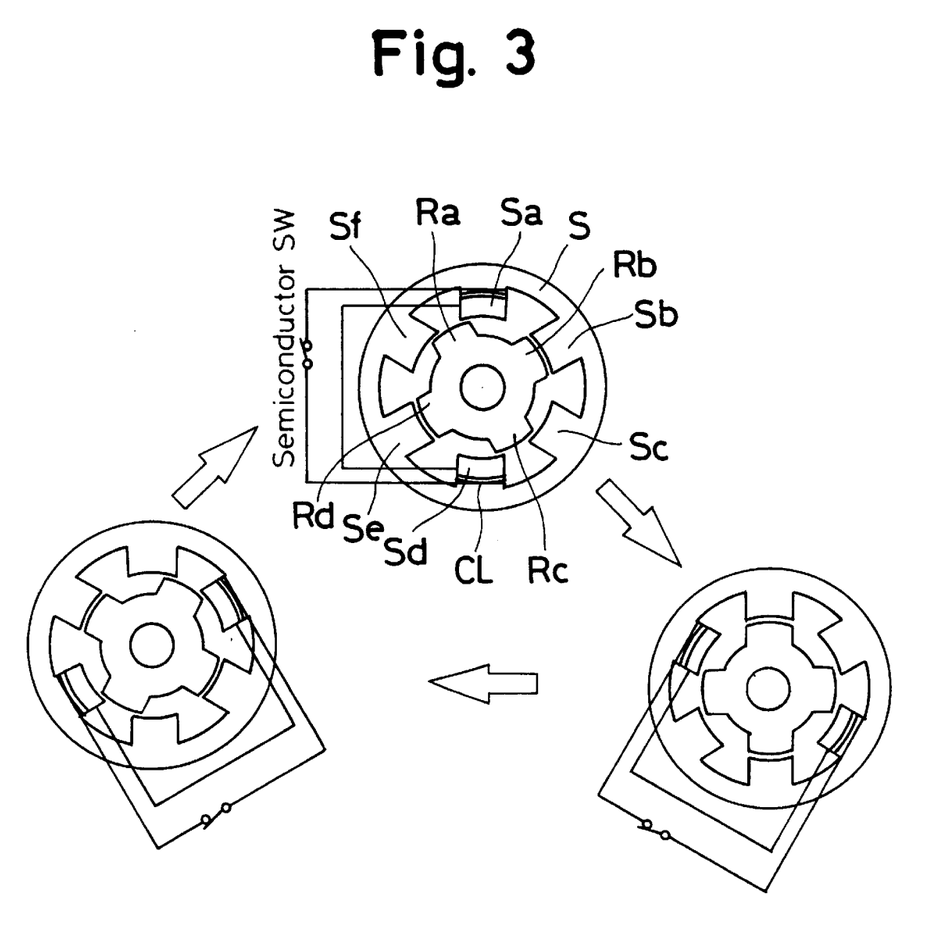
FIG. 3 are views of fundamental structure and action of the SR motor shown in FIG. 1.

The basic construction of the SR motor 1 is illustrated in FIG. 3. The motor 1 shown in FIG. 3a comprises a stator S and a rotor R which is rotatably supported within the internal space of the Stator S. The rotor R comprises a lamination of a number of thin iron sheets and is formed with four outwardly projecting poles Ra to Rd at locations which are spaced apart by 90 degrees around its outer periphery. The stator S also comprises a lamination of a number of thin iron sheets and is formed with six inwardly projecting poles Sa to Sf at locations which are spaced apart by 60 degrees around its inner periphery. Each pole Sa to Sd off the stator S has an electrical coil CL disposed thereon although only two coils of a single phase are shown in FIG. 3.

The coils CL, each of which is disposed on the stator poles Sa and Sd respectively, are denoted as phase 1 and denoted by reference character 1a in FIG. 1, the coils, each of is disposed on the stator poles Sb and Se respectively, are denoted as phase 2 and denoted by reference character 1b in FIG. 1 and the coils, each of which is disposed on the stator poles Sc and Sf respectively, are denoted as phase 3 and denoted by reference character 1c in FIG. 1.

By sequentially energising the coils CL (1a to 1c) in the sequence of phase 1-phase 2-phase 3 depending on the position of the poles on the rotor a, it is possible to drive the rotor R for continuous rotation in the clockwise direction. Thus, a pole on the stator S that is energised constitutes an electromagnet, and accordingly, a pole on the rotor R which is located close to the electromagnet is attracted thereby for rotational movement. To continue such rotation, it is necessary to switch the energisation of the coils as the rotational movement of the rotor R proceeds. In actuality, the coils that are energised may be switched in the sequence of phase 1-phase 2-phase 3 as the rotor R rotates through 30 degrees.

Referring to FIG. 1, the SR motor 1 is provided with three phase coils 1a, 1b, 1c which are used for driving purposes, and an angle sensor id which detects a rotational position or angle of rotation of the rotor R. The three phase coils 1a, 1b and 1c are connected to phase drivers 12, 13 and 14, respectively, which are contained in the controller ECU. Current sensors 2, 3 and 4 are connected in signal line joining the coil 1a and the driver 12, a signal line joining the coil 1b and the driver 13, and a signal line joining the coil, 1c and the driver 14, respectively. Each of these current sensors 2, 3 and 4 delivers a current signal S6 in the form of a voltage, which is proportional to an actual current flow through each of the coils 1a, 1b and 1c.

The controller ECU contains a CPU (microcomputer) 5, an input interface 6, a current map memory 7, a power supply circuit B, a current waveform generating circuit 9, a comparison circuit 10, an output decision circuit 11, and drivers 12, 13 and 14. The controller ECU sequentially calculates a driving speed (rotation number) on the basis of an angle of rotation of the rotor R detected by the angle sensor 1d, and sequentially calculates a driving torque of the SR motor 1 on the basis of information which is fed from a shift lever, a brake switch, an accelerator switch and an accelerator opening sensor. The controller ECU controls the magnitude of current passed through each of the coils 1a, 1b and 1c of the motor 1 based on the results of such calculation.

Figure 2:
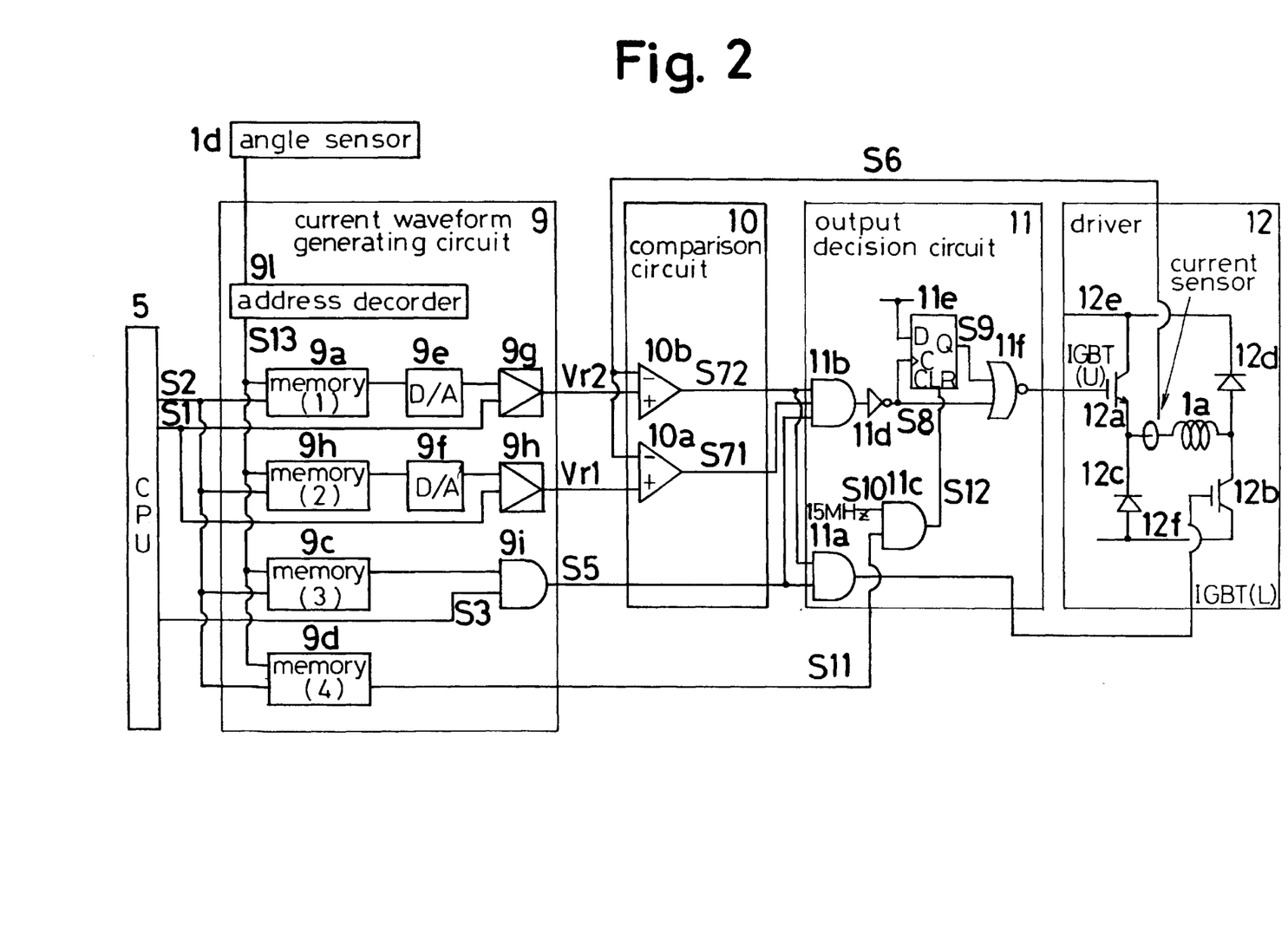
FIG. 2 is a circuit diagram of an essential portion of FIG. 1.

FIG. 2 specifically shows the main part of the circuit shown in FIG. 1. It is to be noted that FIG. 2 shows only the circuit which controls the energisation of phase 1, coil 1a, but that in actuality, similar circuits for controlling the energisation of phase 2 and phase 3 coils 1b and 1c are also provided.

Referring to FIG. 2, phase 1, coil 1a has its one end connected through a switching transistor IGBT (12a) to a high potential line 12e of a direct current power supply while the other end of the coil 1a is connected through a switching transistor IGBT (12b) to a low potential line 12f of the power supply. One end of the phase 1 coil 1a is connected to the low potential line 12f through a diode 12c which allows a current flow from the latter to the former while the other end of the coil 1a is connected to the high potential line 12e through a diode 12d which allows a current flow from the former to the latter. Accordingly, when the transistors 12a and 12b are both turned on, a current flow is established from the power supply to the coil 1a. If either one or both of the transistors are turned off, the energisation of the coil 1a can be interrupted.

The output decision circuit 11 includes AND gates 11a, 11b and 11c, a NOT gate 1id, a flip-flop circuit 11e and a NOR gate 11f. An output terminal of the NOR gate 11f is connected to a gate terminal of the transistor 12a, while an output terminal of the AND gate 11a is connected to a gate terminal of the transistor 12b. Signals S72 and S5 are fed to an input terminal of the AND gate 11a, while signals S8 and S9 are fed to an input terminal of the NOR gate 11f. The signal S72 is a binary signal delivered by an analogue comparator 10b contained in the comparison circuit 10 While the signal S5 is a binary signal delivered by an AND gate 9i contained in the current waveform generating circuit 9. The signal S8 is a binary signal delivered by the NOT gate 1id while the signal S9 is a binary signal delivered by the flip-flop circuit 11e. The signal S8 as an input signal and a signal S12 as a reset signal are fed to the flip-flop circuit 11e. An output of the AND gate 11b is connected to an input of the NOT gate 1id, while a signal S71 and the signals S72 and S5 are fed to an input or the AND gate 11b. The signal S71 is a binary signal delivered by analogue comparator 10a contained in the comparison circuit 10. The signal S12 is delivered by the AND gate 11c while a clock pulse signal S10 of 15 kHz and a signal S11 delivered by the current waveform generating circuit 9, are fed to an input of the AND gate 11c.

The comparison circuit 10 comprises the two analogue comparators 10a and 10b. The analogue comparator 10a delivers a result of comparison between a first standard voltage Vr1 and a voltage Vs6 as a binary signal S71. The standard voltage Vr1 is an output of the current waveform generating circuit 9 while the voltage Vr6 is a voltage of the signal S6 corresponding to a current detected by the current sensor 2. The analogue comparator 10b delivers a result of comparison between a second standard voltage Vr2 and the voltage Vs6 as a binary signal S72. The standard voltage Vr2 is another output of the current waveform generating circuit 9. In this embodiment, the first standard voltage Vr1 is always smaller than the second standard voltage Vr2.

When the signals S5 and S11 are both at a high level H, the transistors 12a and 12b contained in the driver are controlled in the following three states on the basis of the result of the comparison among the voltage Vs6 of the signal S6 and the first and second voltages Vr1 and Vr2. When the voltage Vs6 is smaller than the voltage Vr1, the signals S71 and S72 are both at a high level H, so that the outputs of the AND gates 11a and 11b are both at a high level H and the transistor 12b is turned on. Meanwhile, the output signal S8 of the NOT gate 11 is at a low level L. The output signal S9 of the flip-flop circuit 11e is not changed at the moment and maintained as a high level H until the signal S12 is turned to a high level H by the clock pulse signal S10. When the signal S12 is turned to a high level H, the output signal S9 is turned to a low level L, so that the output of the NOR gate 11f is turned to a high level H and the transistor 12a is turned on. When the voltage Vs6 is greater than the second standard voltage Vr2, the signals S71 and S72 are both at a low level L, so that the outputs of the AND gates 11a and 11b are both at a low level L and the transistor 12b is turned off. Meanwhile, the output signal S8 of the NOT gate 11 is turned to a high level H, so that the output signal S9 of the flip-flop circuit 11e is turned to a high level on the basis thereof. The output of the NOR gate 11f is therefore turned to a low level L, so that the transistor 12a is turned off. When the voltage Vs6 is greater than the first voltage Vr1 and smaller than the second standard voltage Vr2, the signal S71 is at a low level L and the signal S72 is at a high level H, so that the output of the AND gate 11a is at a high level H and the transistor 12b is turned on. The output of the AND gate 11b is at a low level L and the output signal S8 of the NOT gate lid is at a high level H, so that the output signal S9 of the flip-flop circuit 11e is turned to a high level on the basis thereof. The output of the NOR gate 11f is therefore at a low level L, so that the transistor 12a is turned off.

When the signal S5 is at a low level L and the signal S11 is at a high level H, the outputs of the AND gates 11a and 11b are always at a low level L irrespective of the output signals S71 and S72 of the comparison circuit 10, so that the transistor 12b is turned off. Meanwhile, the output signal S8 of the NOT gate 11d is at a high level, so that the output signal S9 of the flip-flop circuit 11e is turned to a high level on the basis thereof. The output of the NOR gate 11f is therefore at a low level L, so that the transistor 12a is turned off. Thus, the transistors 12a and 12b are both turned off when the signal S5 is at a low level L.

When the signal S5 is at a high level H and the signal S11 is at a low level L, the transistors 12a and 12b are controlled in the following three states on the basis of the result of the comparison among the voltage Vs6 of the signal S6 and the first and second voltages Vr1 and Vr2. When the voltage Vs6 is smaller than the voltage Vr1, the signals S71 and S72 are both at a high level H, so that the outputs of the AND gates 11a and 11b are both at a high level K and the transistor 12b is turned on. Meanwhile, the output signal S8 of the NOT gate 11 is at a low level L. The output signal S9 of the flip-flop circuit 11e is not changed at the moment. Since the signal S11 is at a low level L, the output signal S12 off the AND gate 11c is always at a low level L, so that the flip-flop circuit 11e is not reset. When the voltage Vs6 is greater than the second standard voltage Vr2, the signals S71 and S72 are both at a low level L, so that the outputs of the AND gates 11a and 11b are both at a low level L and the transistor 12b is turned off. Meanwhile, the output signal S8 of the NOT gate lid is turned to a high level H, so that the output signal S9 of the flip-flop circuit 11e is turned to a high level on the basis thereof. The output of the NOR gate 11f is therefore turned to a low level L, so that the transistor 12a is turned off. When the voltage Vs6 is greater than the first voltage Vr1 arid smaller than the second standard voltage Vr2, the signal S71 is at a low level L and the signal S72 is at a high level H, so that the output at the AND gate 11a is at a high level H and the transistor 12b is turned on. The output of the AND gate 11b is at a low level L and the output signal S8 of the NOT gate lid is at a high level H, so that the output signal S9 of the flip-flop circuit 11e is turned to a high level on the basis thereof. The output of the NOT gate 11f is therefore at a low level L, so that the transistor 12a is turned off.

When the signals S5 and S11 are both at a low level L, the outputs of the AND gates 11a and 11b are always at a low level L, irrespective of the output signals S71 and S72 of the comparison circuit 10, so that the transistor 12b is turned off. Meanwhile, the output signal S8 of the NOT gate 11d is at a high level, so that the output signal S9 of the flip-flop circuit 11e is turned to a high level on the basis thereof. The output of the NOR gate 11f is therefore at a low level L, so that the transistor 12a is turned off. Therefore, the transistors 12a and 12b are both turned off when the signal S5 is at a low level L.

Current flowing through the coil 1a and number of magnetic flux linkage generated at the coil 1a is varied according to the turn-on/-off of the transistors 12a and 12b. Thus, the current rises according to the time constant of the circuits when the transistor 12a and 12b are both turned on. The number of the flux linkage is also increased according to a characteristic of the magnetic circuit. These are not adjusted by any control. When the transistor 12a is turned off and the transistor 12b is turned on, the current slowly falls by a very large time constant. The number off the flux linkage is almost unchanged.

When the first and second standard voltages (target value of current) Vr1 and Vr2 are almost unchanged, the voltage Vs6 is always smaller than the second standard voltage Vr2, since the difference between the first standard voltage Vr1 and the voltage Vs6 representing the current passing through the coil is not increased even if the falling speed of the current is slow. For the moment, fluctuation difference in current is small. When the energising phase of the coils is changed, the first and second standard voltages (target value of current) Vr1 and Vr2 are changed. The voltage Vs6 is greater than the second standard voltage Vr2 if the falling speed of current is slow. At the moment, the transistors 12a and 12b are both turned off, so that the falling speed of current is increased. Current is rapidly varied to follow the first and second standard voltages (target value of current) Vr1 and Vr2. When change of the first and second standard voltages (target value of current) Vr1 and Vr2 is finished, the falling Speed of current is again slowed down since the difference between the first standard voltage Vr2 and the voltage Vs6 is decreased.

Consequently, a delay of current variation against the change of the target value is prevented. Furthermore, vibration and noise of the SR motor are reduced since the varying speed of the current is slow and the change of the magnetic flux is small when the change of target value is small JPO3 (1992)-049584 A shows an advantage by the above turn-on/-off of either of the two transistors which control the coil energisation in detail. When the falling speed of the current is changed on the basis of the output signals of S71 and S72 of the comparison circuit 10 shown in FIG. 2, there is a tendency that an actual timing to change the speed is slightly delayed from an optimum timing to change the speed. When the target value suddenly falls, it is ideal that the falling speed of current is accelerated. However, the signal S72 is not changed to a low level L until the differences of current are actually sufficient. Therefore, there is the above delay in timing. Current variation following the target value might be insufficient since the varying speed of the current is automatically changed on the basis of the signals S71 and S72 when the target value is rapidly changed.

In this embodiment, the falling speed of the current is accelerated irrespective of the magnitude of the current (Vs6) by means of that the signal S5 is controlled. The transistors 12a and 12b are both turned off irrespective of the signals S71 and S72 when the signal is controlled to be changed at a low level L so that the falling speed of current is accelerated.

As mentioned above, an iron loss of the SR motor is dependent on a maximum number of the magnetic flux of each coil during energisation and the number of the magnetic flux is the greatest at the current fall. The maximum number of the magnetic flux is reduced by controlling the energisation of the coils although a conventional motor is used. Since quantity of the magnetic flux is increased while the transistors 12a and 12b are turned on, this term that the transistors are turned on is shortened as possible.

Furthermore, when the current falls, the current fall process is started since either of the transistors 12a and 12b is turned off at first so that increase of the magnetic flux is avoided and then the current fall is completed, since the transistors 12a and 12b are both turned off. Therefore, this embodiment makes it possible to reduce the maximum number of the magnetic flux by the above.

Referring to FIG. 2, the current waveform generating circuit 9 outputs the first and second standard voltages Vr1 and Vr2 and the binary signals S5 and S11. The standard voltages Vr1 and Vr2 and the binary signals S5 and S11 are generated on the basis of information stored in the memories (RAM) 9b, 9c and 9d respectively. The memory 9a, 9b, 9c and 9d comprises 8-bit, 8-bit, 1-bit and 1-bit data in each address. The 8-bit data read from the memory 9a is converted to an analogue voltage by a D/A (Digital/Analogue) converter 9e and is used as the standard voltage Vr2 through an amplifier 9g. The 8-bit data read from the memory 9b is also converted to an analogue voltage by a D/A converter 9f and is used as the standard voltage Vr1 through an amplifier 9h. A level (magnitude) of an analogue signal S1 outputted from the CPU 5 is added to input of the amplifiers 9g and 9h respectively. The standard voltages are exactly adjusted respectively since the level of the signal S1 is adjusted. The 1-bit data outputted from the memory 9c is used as the signal S5 through an AND gate 9i. A binary signal (start/stop signal) S3 outputted from the CPU 5 is added to another input terminal of the AND gate 9i. While the SR motor 1 is driven, the signal 53 is always at a high level H, so that the binary signal S3 is dependent on the output signal of the memory 9c. The 1-bit data outputted from the memory 9d is directly used as the signal S11.

The memories 9a, 9b, 9c and 9d comprise a plurality of addresses respectively and each address corresponds to each angle (each 1 degree) of rotation of the rotor R. An address decoder 9j generates address information on the basis of the signal S13 representing the angle of rotation of the rotor R detected by the angle sensor 1d. The address information is fed to address input terminals of the memories 9a, 9b, 9c and 9d at the same time respectively. While the SR motor is driven and the rotor R rotates, the memories 9a, 9b, 9c and 9d output data stored in addresses corresponding to each angle of rotation of the rotor R. The status of the standard voltage Vr1 and Vr2 and the binary signals S5 and S11 could be different with respect to the angle of rotation of the rotor R.

Figure 4:
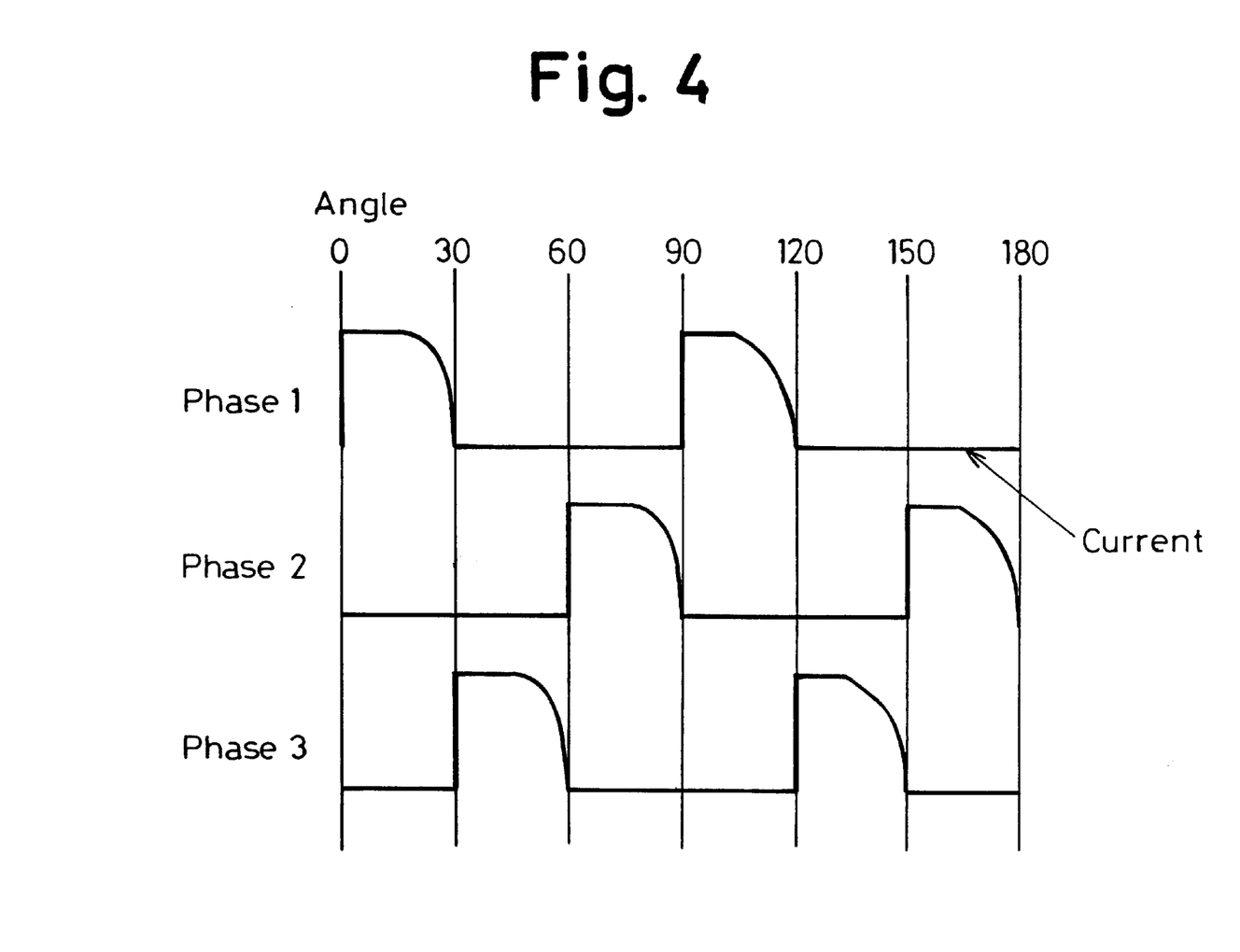
FIG. 4 is a time chart showing an example or current waveform to drive the SR motor.
Figure 8:
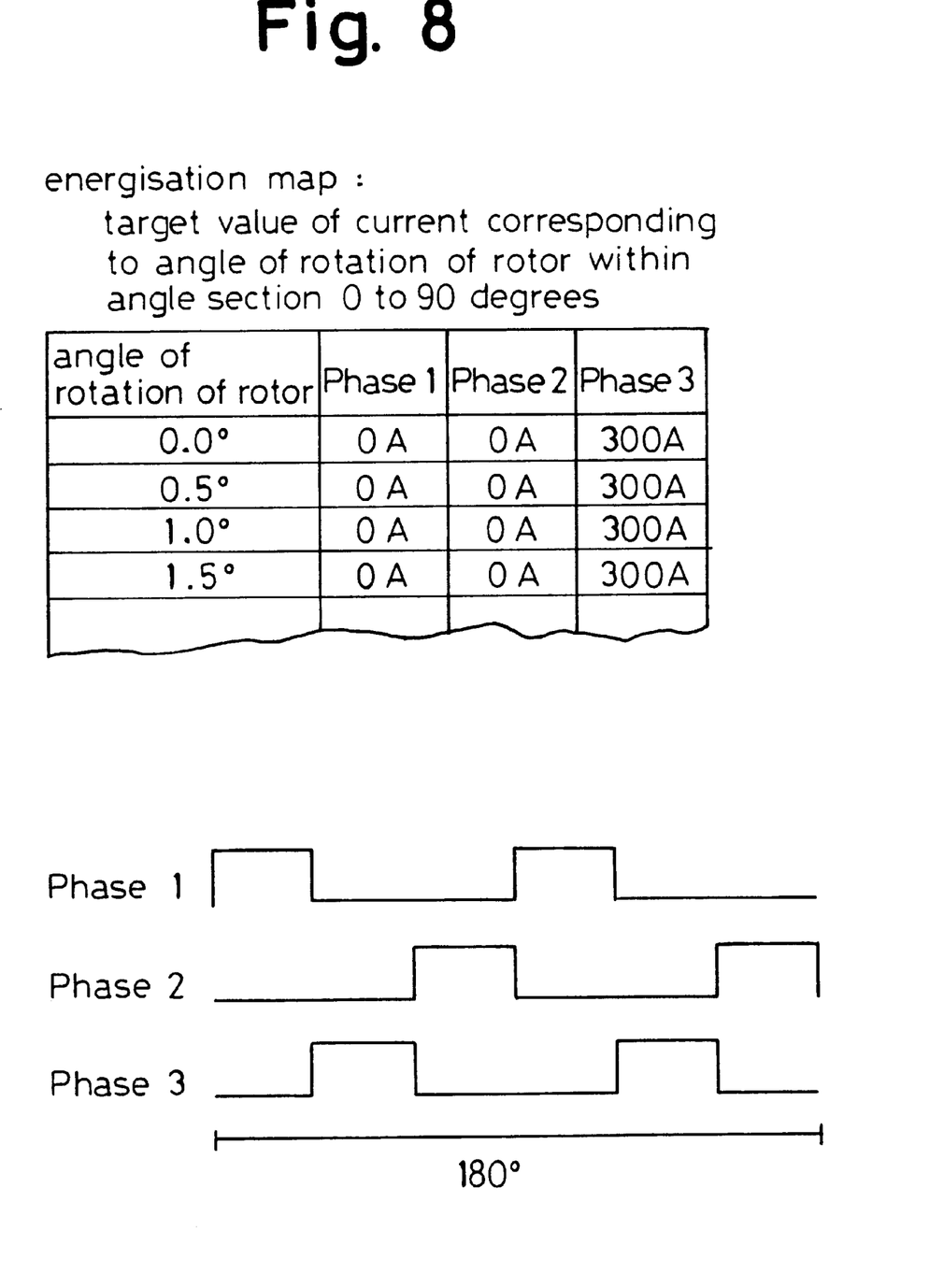
FIG. 8 is a map of the contents of an energisation map memory.

The memories 9a and 9b comprise information of the energising map shown in FIG. B respectively so as to supply the current waveform shown in FIG. 4 to the three phase coil. A target value for current to be supplied at each angle of rotation is comprised in each address corresponding to each angle of rotation (each 0.5 degree in this embodiment). Information of memories 9a and 9b correspond to the standard voltage Vr1 and Vr2 respectively, so that the content of the memory 9a is somewhat different from that of the memory 9b so as to satisfy the relation that the voltage Vr2 is greater than the voltage Vr1. As mentioned above, a level of current for the coil 1a is varied to follow the first standard voltage Vr1. The current is supplied shown in FIG. 4 since the current waveform to be supplied to the coil 1a is registered as the standard voltage Vr1 and Vr2 in memories 9a and 9b.

In this embodiment, it is necessary to switch the energisation/deenergisation of each coil 1a, 1b and 1c of the three phase coil in every 30 degrees the rotor R rotates, as shown in FIG. 4. The energisation/deenergisation in every 30 degrees is automatically switched in accordance with the signals S71, S72, S5 and S11 since the waveform shown in FIG. 4 is registered in the memories 9a and 9b. Thus, CPU 5 itself does not switch the energisation/deenergisation of each of the coils 1a, 1b and 1c.

Regarding the memory 9c, most of its address comprises information "1" corresponding to a high level H for the signal S5. However, addresses corresponding to angles where the target value (Vr1, Vr2) suddenly fall comprise information to "0" (compulsory switch off information) corresponding to a low level L, for the signal S5. The signal S5 is turned to a low level L on the basis of information in the memory 9c so that the varying speed of the current is compulsory accelerated before the automatic switching by the signal S72, when it is expected at an angle of rotation that the varying speed of the current should be accelerated since a slope of the current fall is steep at a starting point of current waveform falling of the target value (Vr1, Vr2) of the current. Therefore, time delay is prevented at the switching of varying speed of the current, so that the following characteristic of the current against the target value is improved. Regarding memory 9d, one address where the transistor 12a is turned off comprises information "0" corresponding to a low level L for the signal S11 and the other address comprises information "1" corresponding to a high level H for the signal S11. Writing and reading data are possible at memories 9a, 9b, 9c and 9d respectively and are processed at the same time. The memories 9a, 9b, 9c and 9d are connected with CPU 5 via a signal line S2 and the CPU 5 refreshes the contents of the memories 9a, 9b, 9c and 9d as the need arises.

Figure 6:
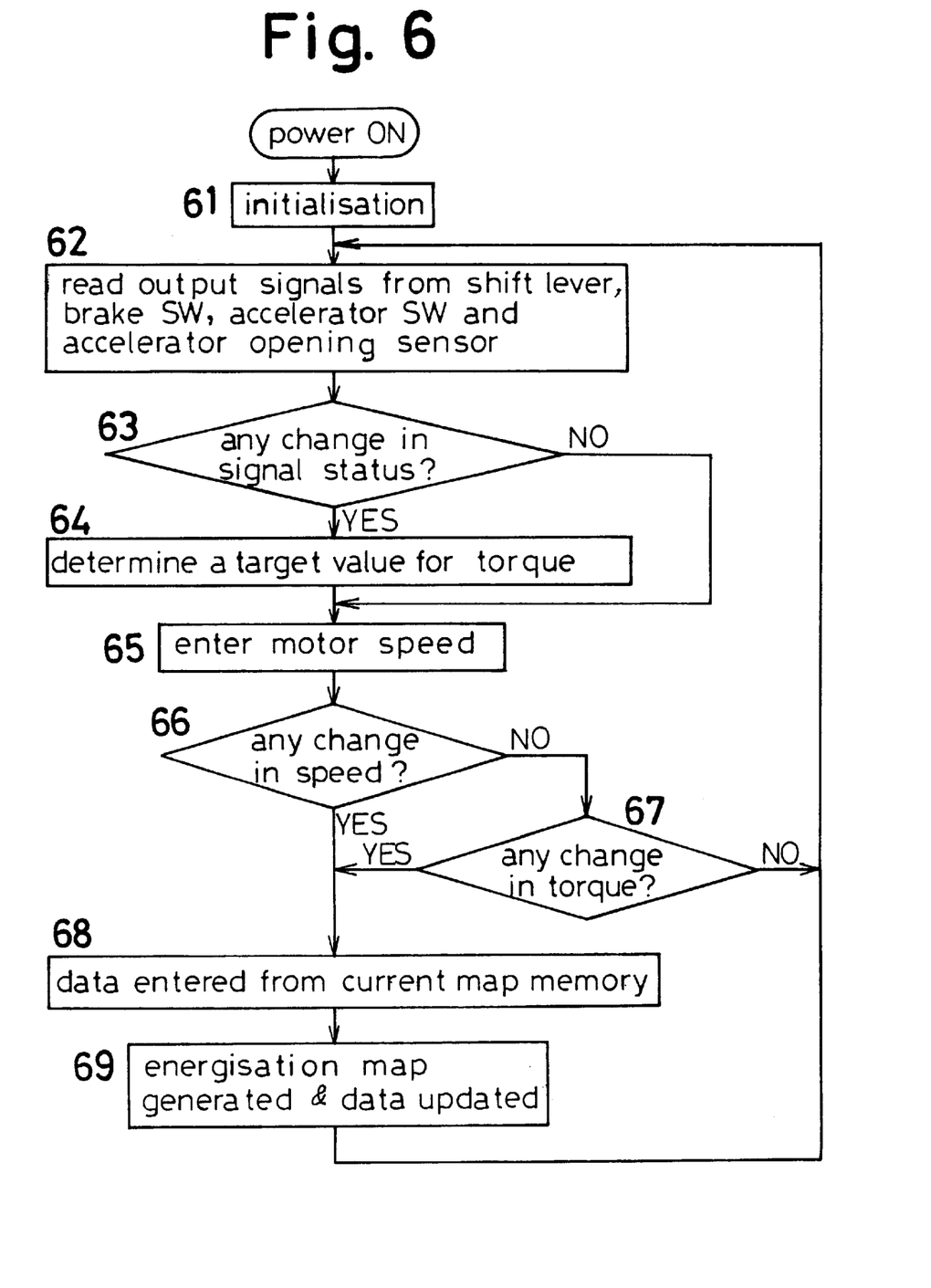
FIG. 6 is a flow chart of an energisation control performed by CPU 5 shown in FIG. 1.

A control operation performed by CPU 5 shown in FIGS. 1 and 2 is schematically indicated in FIG. 6. When the power is turned on, CPU 5 executes an initialization at step 61. Thus, internal memories within CPU 5 are initialized and internal timers and an interrupt mode are set up, followed by a system diagnosis. If no abnormality is found, the operation proceeds to the next step.

At step 62, the status of signals delivered from the shift lever, brake switch, accelerator switch and accelerator opening sensor are read through the input interface 6 and the status of them are stored in an internal memory. If there is any change in the status detected at step 62, the operation proceeds to step 64 through step 63. Otherwise, the operation proceeds to step 65 through step 63.

At step 64, a target value of the driving torque of the SR motor 1 is determined on the basis of various status detected at step 62. For example, when the accelerator opening sensor has detected an increased accelerator opening, a target value of the driving torque is also increased. Here, a torque change flag, indicating that there has been a change in the target torque, is set.

At step 65, the current rotational speed of the SR motor 1 is detected and stored in the internal memory. When there is a change in the rotational speed of the SR motor 1, the operation proceeds from step 66 to step 68. If there is no change in the rotational speed, the operation proceeds from step 66 to step G7 where the status of the torque change flag is examined, and when it is set, indicating that there has been a change in the target torque, the operation proceeds to step 68. When there is no change in the torque, the operation returns to step 62.

Figure 7:
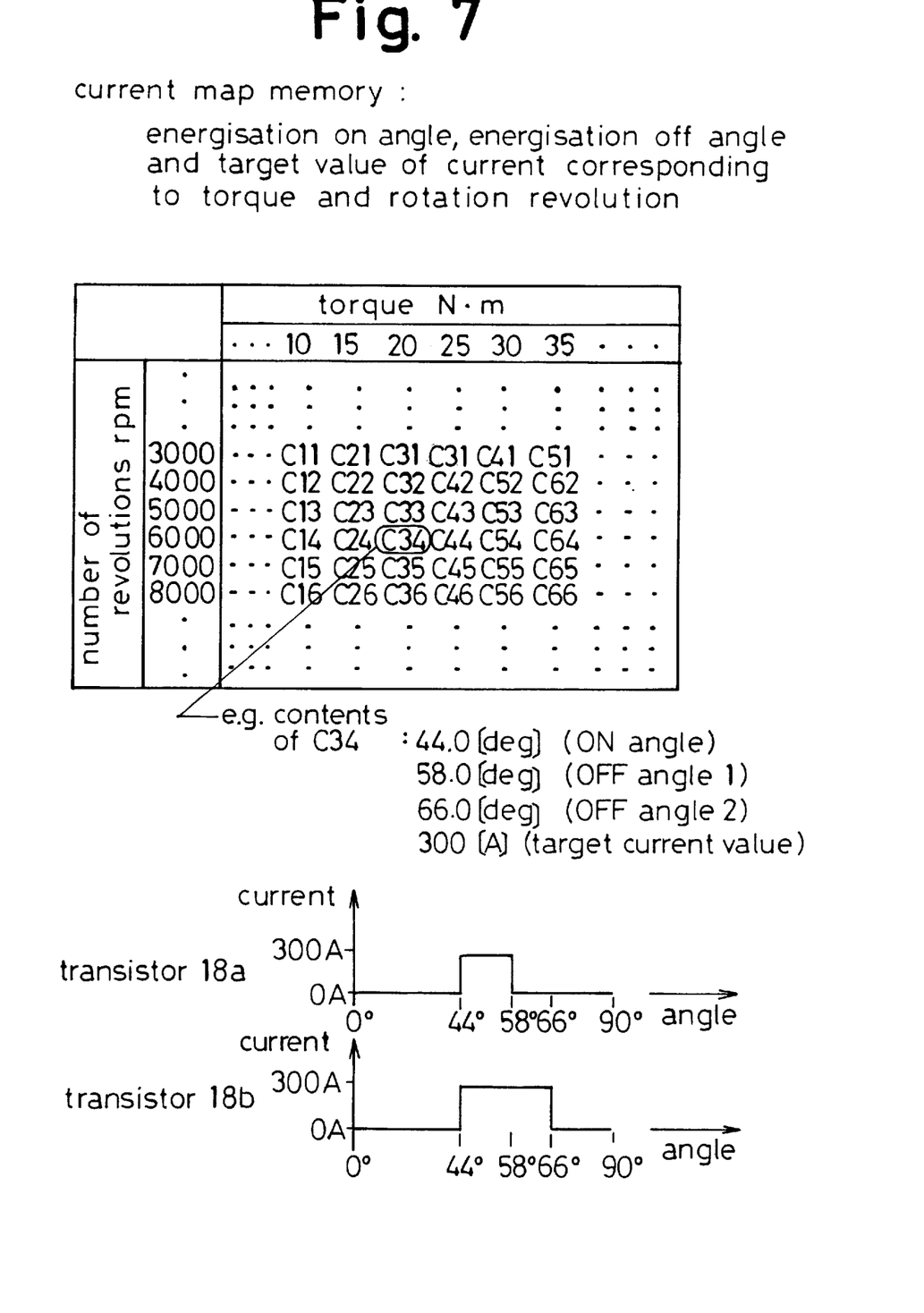
FIG. 7 is a map of the contents of a current map memory.

At step 68, map memory 7 is accessed to read data therefrom. At step 69, an energisation map is generated and data is updated. The map memory 7 is a read-only memory having a variety of data pre-stored therein. Several groups of data stored in the memory 7 are shown in FIG. 7. The map memory 7 contains a multiplicity of data items Cnm, (where n represents a column number corresponding to the torque, and m represents a row number corresponding to the number of revolutions) corresponding to the target torque and numbers of revolution of the SR motor 1 respectively. A set of the data Cnm comprises a first energisation off angle, a second energisation off angle and a target value of the current. By way of example, data item C34 contains 44.0 degrees, 58.0 degrees, 66.0 degrees and 300 A when the target torque is 30 Nm and the rotation speed is 6000 rpm. Thus, within an angle section of rotation of 0 to 90 degrees, a coil is energised by a current of 300 A from 44.0 to 58.0 degrees, either of the two transistors to adjust an energisation of the coil is turned off from 58.0 to 66.0 degrees so as to deenergise the other of the two transistors (current is not supplied from power supply). The coil is not energised from 0 to 43.95 degrees and from 66.05 to 90.0 degrees. At step S68, a set of data Cnm selected on the basis of a torque and a revolution speed at a time is fed.

Figure 5:
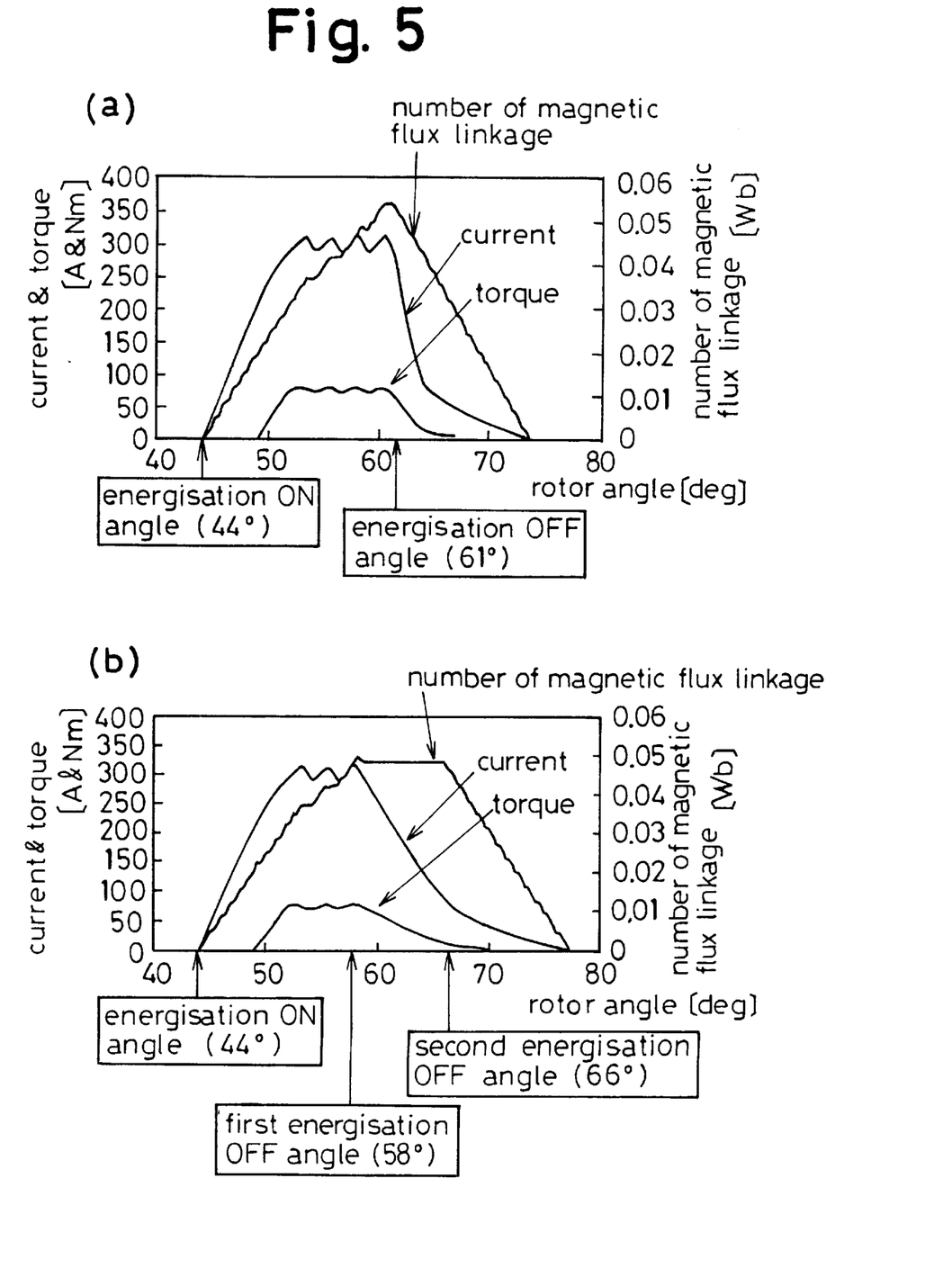
FIGS. 5a and 5b are views of variations of a current waveform, torque waveform and a number of magnetic flux linkages, based on a conventional control (FIG. 5a) and based on the embodiment of the invention (FIG. 5b)

FIG. 5a shows changes of the current waveform torque waveform and number of flux linkage controlled by a conventional manner. An energisation on angle, an energisation off angle and a target value corresponding to an angle of rotation are determined with respect to the coil 1a on the basis of a target torque and a rotation speed, the transistors (switching element) 12a and 12b are both turned on when the angle of rotation is reached at the energisation on angle, the transistor 12a is turned off if a value of an actual current is over the target value of the current while the angle of rotation is not reached at the energisation off angle, and the transistors 12a and 12b are both turned off when the angle of rotation is reached at the energisation off angle. As shown in FIG. 5a, in a section between the energisation on and off angles, increase of number of flux linkage is started at a point where the transistors 12a and 12b are both turned on and is continued until the transistors 12a and 12b are both turned off.

FIG. 5b shows changes of the current waveform, torque waveform and number of flux linkage controlled by the embodiment of the invention. An energisation on angle, a first energisation off angle, a second energisation off angle and a target value corresponding to an angle of rotation are determined with respect to the coil 1a on the basis of a target torque and a rotation speed. The transistors (switching element) 12a and 12b are both turned on when the angle of rotation is reached at the energisation on angle, the transistor 12a is turned off if a value of an actual current is over the target value of the current while the angle of rotation is not reached at the first energisation off angle, the transistor 12a is turned off irrespective of the magnitude of the value of the actual current and the target value of the current when the angle of rotation is reached at the first energisation off angle and the transistors 12a and 12b are both turned off when the angle of rotation is reached at the second energisation off angle. In other words, means for controlling the energisation of the embodiment controls as follows. A target torque is determined for the SR motor on the basis of information fed from means for detecting an angle of rotation of a rotor, means for detecting a rotation speed of the rotor and means for detecting an actual current passing through each phase coil and the outside. An energisation on angle, a first and a second energisation off angle and a target value of a current are determined with respect to each coil on the basis of a target torque and a rotation speed. The first and second switching elements are both turned off when the angle of rotation is within a section from the second energisation off angle to the energisation on angle. The actual value of the current is approximated to the target value by means of alternate repeat that if either the first and second switching element is turned on, the other is turned off. The first and second switching element are both turned on when the angle of rotation is within a section from the energisation on angle to the first energisation off angle. When either the first and second switching element is turned on, the other is turned off when the angle of rotation is within a section from the first to second energisation for angles.

As shown in FIG. 5b, in a section between the first and second energisation off angles, increase of number of flux linkage is stopped at a point where the transistor 12a is turned off irrespective of the magnitude of the value of the actual current and the target value of the current. Referring to both FIGS. 5a and 5b, an output torque of the SR motor according to the embodiment is relatively smaller but sufficient in the section between the first and second energisation off angles. In this section, an iron loss is reduced since the increase of the number of the flux linkage is stopped, so that the efficiency of the SR motor 1 is improved.

While the preferred embodiments have been described, variations thereto will occur to those skilled in the art within the scope of the present inventive concepts which are delineated by the following claim.

What is claimed is:

1. An energisation control system of a switched reluctance motor comprising multiphase coil disposed on a stator, each coil having one end connected, through a first switching element, to a first power supply line of a first potential, said first potential is either high or low potential, and connected to a second power supply line of a second potential, said second potential is either high or low potential and is not the same as the first potential, through a first diode which allows a current flow from the second power supply line to the one end of the coil, and said each coil having an opposite end connected, through a second switching element, to the second power supply line and connected to the first power supply line through a second diode which allows a current flow from the opposite end of the coil to the first power supply line, wherein the control system comprises:

means for determining a target torque for the switched reluctance motor on the basis of an angle of rotation of a rotor, a rotation speed of the rotor, and an actual current passing through said each coil and the outside;

means for determining an energisation on angle, a first energisation off angle, a second energisation off angle and a target value of a current with respect to said each coil on the basis of the target torque and a rotation speed of the rotor; and means for turning each of the first and second switching elements on and off, configured to turn off both the first and second switching elements when the angle of rotation is within a section from the second energisation off angle to the energisation on angle, turn on both the first and second switching elements when the angle of rotation is reached at the energisation on angle, turn on either one of the first and second switching elements and turn off the other of the first and second switching elements when the angle of rotation is reached at the first energisation off angle, and turn off both the first and second switching elements when the angle of rotation is reached at the second energisation off angle;

wherein the actual value of the current is approximated to the target value by means of alternate repeat such that either of the first and second switching elements is turned on, the other of the first and second switching elements is turned off, and the first and second switching elements are both turned on when the angle of rotation is within a section from the energisation on angle to the first energisation off angle, and either of the first and second switching elements is turned on the other is turned off when the angle of rotation is within a section from the first to second energisation off angles.

2. An energisation control system of a switched reluctance motor according to claim 1, wherein one of the first and second switching elements is turned off if a value of the actual current is over the target value of the current while the angle of rotation is not reached at the first energisation off angle.

3. An energisation control system of a switched reluctance motor according to claim 2, wherein one of the first and second switching elements is turned off irrespective of the magnitude of the value of the actual current and the target value of the current when the angle of the rotation is reached at the first energisation off angle.

* * * * *